UNITED STATES PATENT OFFICE.

EDUARD HUEBNER AND JULIUS HUEBNER, OF NEWARK, NEW JERSEY.

IMPROVEMENT IN PREPARING FISH-SCALES FOR USE IN THE ARTS.

Specification forming part of Letters Patent No. 150,043, dated April 21, 1874; application filed March 21, 1874.

*To all whom it may concern:*

Be it known that we, EDUARD HUEBNER and JULIUS HUEBNER, of Newark, Essex county, New Jersey, have invented certain new and useful Improvements in Preparing Fish-Scales for Use in the Arts, of which the following is a specification:

The object of our invention is to utilize the scales of several varieties of fish, hitherto thrown away as useless, and prepare them for application in the arts, by producing articles of jewelry, artificial flowers, and similar objects. Our invention consists in the process of cleansing and purifying the scales till the clear, horny substance or core of the same is obtained, which produces a new article of manufacture, which may be stamped into various ornamental shapes, and dyed in all colors for use in the arts.

Among the various species of fish, we have found those with larger scales to be most useful and advantageous. The scales have, for this purpose, to be taken from the live fish, or soon after the same has been killed. Old scales cannot be used, as they lose their elasticity and clearness by the influence of the chemical decomposition of the outer layers on their horny part. The scales are then exposed for twenty-four hours to the action of pure salt-water, for loosening and partially separating the outer layers of organic matter and their skins. They are then transferred into distilled water, being placed every two or three hours in clean water and washed therein, which is repeated five or six times, till the scales get soft and clear. Each scale is then carefully rubbed with clean linen rags, for removing the particles still adhering thereto, being then passed through a press having a linen lining and thoroughly pressed, so that the moisture retained in the scales, by the foregoing treatment, is entirely taken out without the action of air thereon. The scales are finally placed for one hour in alcohol, and again rubbed and pressed, being then produced entirely clear and dry, having a perfectly clear appearance, a mother-of-pearl-like hue, and great elasticity and durability.

The scales are used in this prepared state, or they may be dyed with aniline and other colors, in the usual manner, to be stamped out into various kinds of ornamental shapes, leaves, and flowers, and applied in the manufacture of jewelry and artificial flowers, for embroidering and inlaying wood, and other uses in the arts.

Having thus described our invention, we claim as new and desire to secure by Letters Patent—

1. The process herein set forth of treating and preparing fish-scales for use in the arts, substantially as described.

2. As a new article of manufacture, the horny substance or core of fish-scales produced in the manner set forth, to be then stamped, dyed, or otherwise prepared for the various applications in the arts, substantially as specified.

EDUARD HUEBNER.
JULIUS HUEBNER.

Witnesses:
PAUL GOEPEL,
T. B. MOSHER.